US012063653B2

(12) United States Patent
Ren et al.

(10) Patent No.: US 12,063,653 B2
(45) Date of Patent: Aug. 13, 2024

(54) SPLIT UPLINK CONTROL INFORMATION FOR FULL-DUPLEX COMMUNICATIONS

(71) Applicant: QUALCOMM Incorporated, San Diego, CA (US)

(72) Inventors: Yuwei Ren, Beijing (CN); Chao Wei, Beijing (CN); Min Huang, Beijing (CN); Yu Zhang, San Diego, CA (US); Huilin Xu, Temecula, CA (US); Qiaoyu Li, Beijing (CN); Chenxi Hao, Beijing (CN); Liangming Wu, Beijing (CN); Hao Xu, Beijing (CN); Changlong Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 17/596,360

(22) PCT Filed: Jul. 1, 2019

(86) PCT No.: PCT/CN2019/094152
§ 371 (c)(1),
(2) Date: Dec. 8, 2021

(87) PCT Pub. No.: WO2021/000212
PCT Pub. Date: Jan. 7, 2021

(65) Prior Publication Data
US 2022/0232556 A1 Jul. 21, 2022

(51) Int. Cl.
*H04W 72/21* (2023.01)
*H04L 5/14* (2006.01)
*H04W 72/23* (2023.01)

(52) U.S. Cl.
CPC ............ *H04W 72/21* (2023.01); *H04L 5/14* (2013.01); *H04W 72/23* (2023.01)

(58) Field of Classification Search
CPC ...... H04W 76/28; H04W 72/21; H04W 72/23; H04W 72/0446; H04W 48/20;
(Continued)

(56) References Cited

U.S. PATENT DOCUMENTS

2011/0312328 A1* 12/2011 Choi ................. H04W 72/541
455/450
2012/0250526 A1 10/2012 Zhao et al.
(Continued)

FOREIGN PATENT DOCUMENTS

CN 105991256 A 10/2016
CN 107277908 A 10/2017
(Continued)

OTHER PUBLICATIONS

International Search Report and Written Opinion—PCT/CN2019/094152—ISA/EPO—Mar. 26, 2020.
(Continued)

*Primary Examiner* — Wei Zhao
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information for an uplink control channel, wherein the configuration information includes at least one of: a first resource identifier associated with a non-full-duplex (non-FD) zone, or a second resource identifier associated with a full-duplex (FD) zone. The UE may transmit uplink control information (UCI) on the uplink control channel in at least one of the non-FD zone or the FD zone in accordance with the configuration information. Numerous other aspects are provided.

33 Claims, 7 Drawing Sheets

(58) Field of Classification Search
CPC ..... H04W 52/02; H04W 36/32; H04W 36/30; H04W 36/0094; H04L 5/14
See application file for complete search history.

(56) References Cited

U.S. PATENT DOCUMENTS

| | | |
|---|---|---|
| 2014/0146756 A1 | 5/2014 | Sahin et al. |
| 2016/0233904 A1 | 8/2016 | Wu et al. |
| 2017/0257177 A1* | 9/2017 | Noh .......................... H04L 5/14 |
| 2019/0165896 A1 | 5/2019 | Huang et al. |
| 2020/0092685 A1* | 3/2020 | Fehrenbach ............ H04W 4/44 |

FOREIGN PATENT DOCUMENTS

| | | |
|---|---|---|
| CN | 107493604 A | 12/2017 |
| WO | 2017222511 A1 | 12/2017 |
| WO | WO-2018227164 A1 | 12/2018 |
| WO | WO-2019034759 A1 | 2/2019 |

OTHER PUBLICATIONS

QUALCOMM: "Summary of CRs on UCI Multiplexing on PUSCH", 3GPP TSG RAN WG1 #96bis, R1-1905613, Apr. 12, 2019 (Apr. 12, 2019), 1 page, the whole document.
Supplementary European Search Report—EP19936150—Search Authority—Munich—Dec. 23, 2022.

\* cited by examiner

SPLIT UPLINK CONTROL INFORMATION FOR FULL-DUPLEX COMMUNICATIONS

CROSS-REFERENCE TO RELATED APPLICATION

This application is a 371 national stage of PCT Application No. PCT/CN2019/094152, filed on Jul. 1, 2019, entitled "SPLIT UPLINK CONTROL INFORMATION FOR FULL-DUPLEX COMMUNICATIONS," which is hereby expressly incorporated by reference herein.

FIELD OF THE DISCLOSURE

Aspects of the present disclosure generally relate to wireless communication and to techniques and apparatuses for split uplink control information (UCI) for full-duplex communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving configuration information for an uplink control channel, wherein the configuration information includes at least one of: a first resource identifier associated with a non-full-duplex (non-FD) zone, or a second resource identifier associated with a full-duplex (FD) zone; and transmitting uplink control information (UCI) on the uplink control channel in at least one of the non-FD zone or the FD zone in accordance with the configuration information.

In some aspects, a UE for wireless communication may include memory and one or more processors operatively coupled to the memory. The memory and the one or more processors may be configured to receive configuration information for an uplink control channel, wherein the configuration information includes at least one of: a first resource identifier associated with a non-FD zone, or a second resource identifier associated with an FD zone; and transmit UCI on the uplink control channel in at least one of the non-FD zone or the FD zone in accordance with the configuration information.

In some aspects, a method of wireless communication, performed by a base station, may include transmitting configuration information for an uplink control channel, wherein the configuration information includes at least one of: a first resource identifier associated with a non-FD zone, or a second resource identifier associated with an FD zone; and receiving UCI on the uplink control channel in at least one of the non-FD zone or the FD zone in accordance with the configuration information.

In some aspects, a base station for wireless communication may include memory and one or more processors operatively coupled to the memory. The memory and the one or more processors may be configured to transmit configuration information for an uplink control channel, wherein the configuration information includes at least one of: a first resource identifier associated with a non-FD zone, or a second resource identifier associated with an FD zone; and receive UCI on the uplink control channel in at least one of the non-FD zone or the FD zone in accordance with the configuration information.

In some aspects, a non-transitory computer-readable medium may store one or more instructions for wireless communication. The one or more instructions, when executed by one or more processors of a base station, may cause the one or more processors to: receive configuration information for an uplink control channel, wherein the configuration information includes at least one of: a first resource identifier associated with a non-FD zone, or a second resource identifier associated with an FD zone; and transmit UCI on the uplink control channel in at least one of the non-FD zone or the FD zone in accordance with the configuration information.

In some aspects, a non-transitory computer-readable medium may store one or more instructions for wireless communication. The one or more instructions, when executed by one or more processors of a base station, may cause the one or more processors to: transmit configuration information for an uplink control channel, wherein the configuration information includes at least one of: a first resource identifier associated with a non-FD zone, or a second resource identifier associated with an FD zone; and receive UCI on the uplink control channel in at least one of the non-FD zone or the FD zone in accordance with the configuration information.

In some aspects, an apparatus for wireless communication may include means for receiving configuration information for an uplink control channel, wherein the configuration information includes at least one of: a first resource identifier associated with a non-FD zone, or a second resource identifier associated with an FD zone; and means for transmitting UCI on the uplink control channel in at least one of the non-FD zone or the FD zone in accordance with the configuration information.

In some aspects, an apparatus for wireless communication may include means for transmitting configuration information for an uplink control channel, wherein the configuration information includes at least one of: a first resource identifier associated with a non-FD zone, or a second resource identifier associated with an FD zone; and means for receiving UCI on the uplink control channel in at least one of the non-FD zone or the FD zone in accordance with the configuration information.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
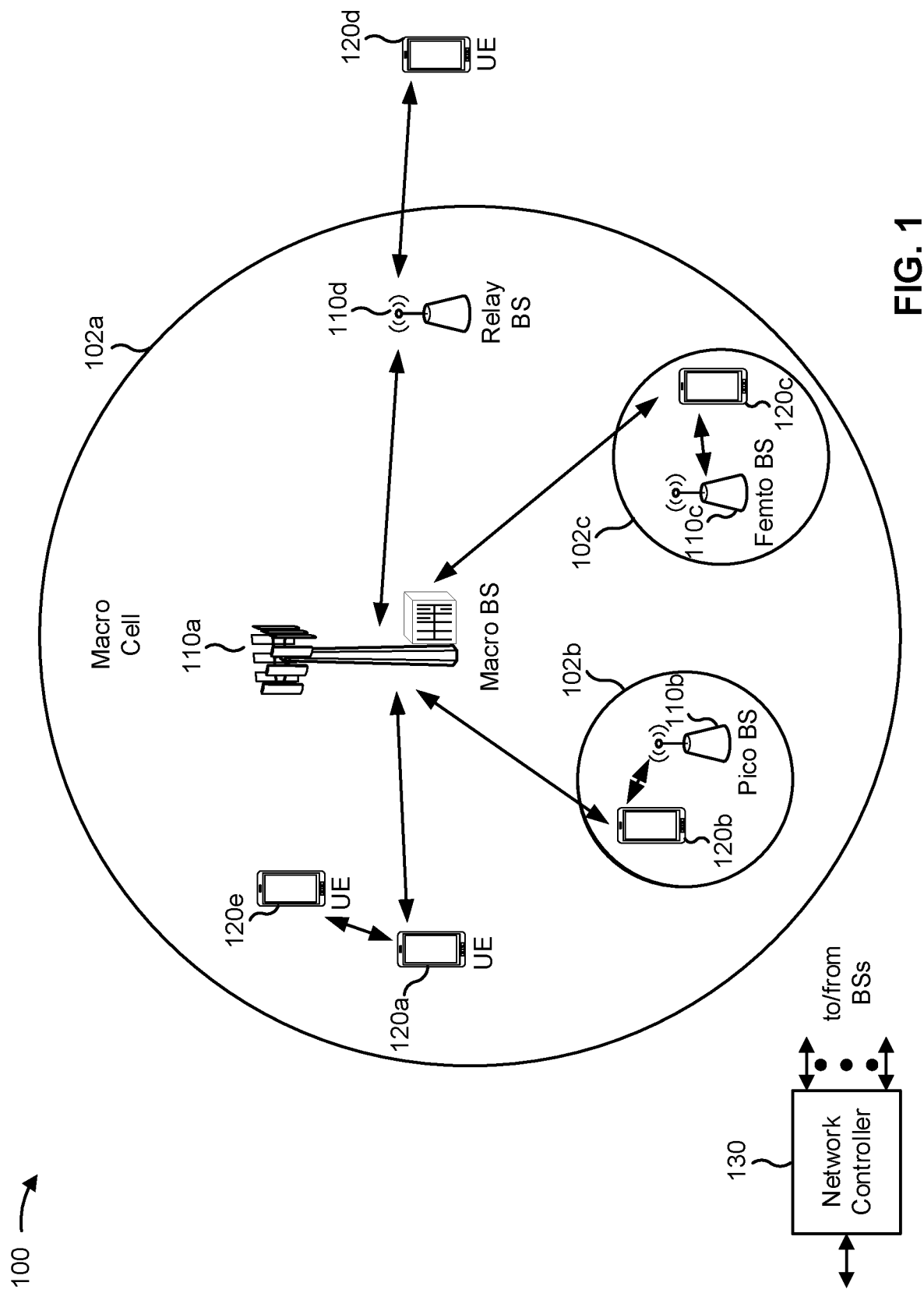
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
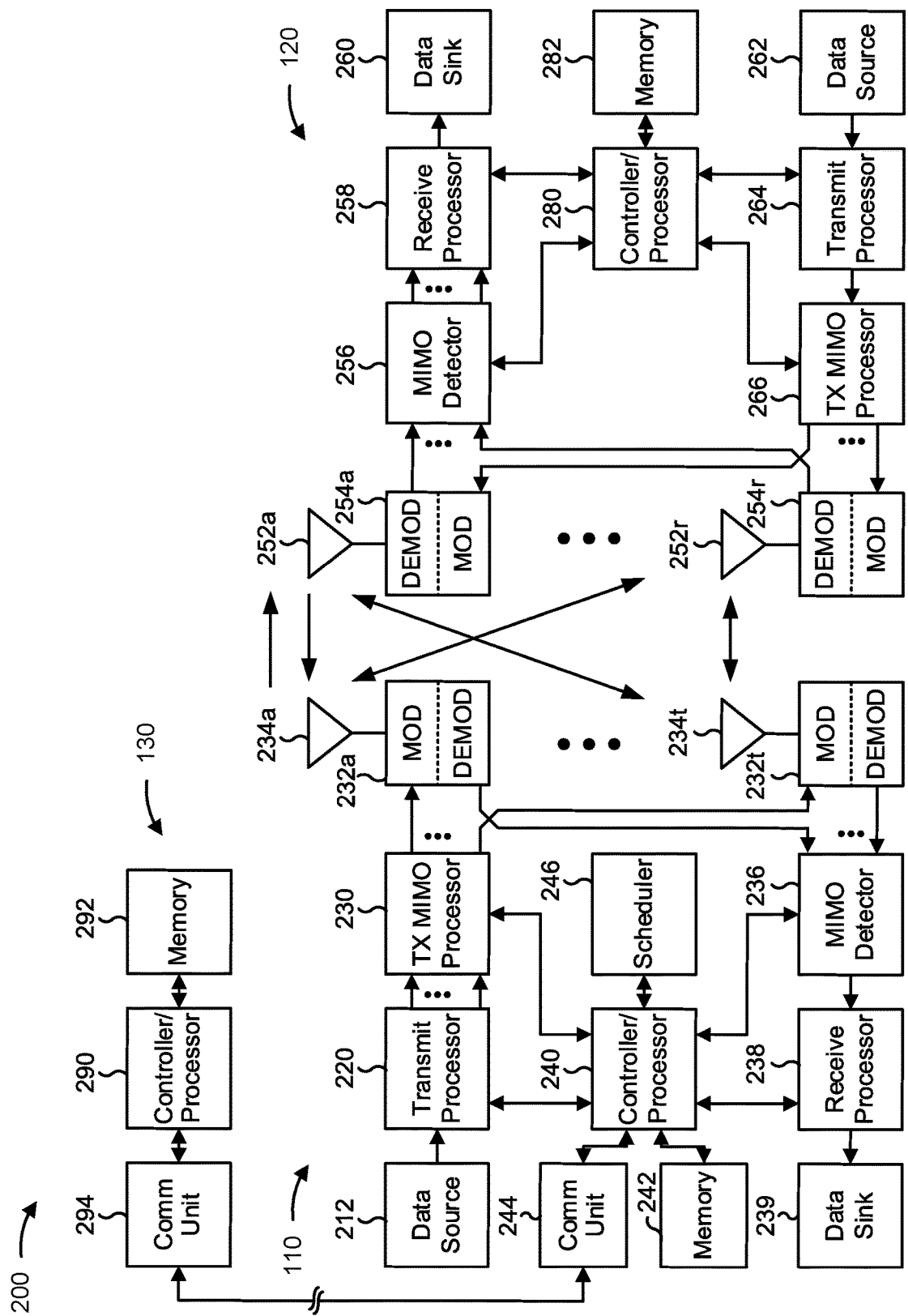
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with split UCI for full-duplex (FD) communications, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving configuration information for an uplink control channel, wherein the configuration information includes at least one of: a first resource identifier associated with a non-full-duplex (non-FD) zone, or a second resource identifier associated with a full-duplex (FD) zone; means for transmitting uplink control information (UCI) on the uplink control channel in at least one of the non-FD zone or the FD zone in accordance with the configuration information; means for selecting a resource for the uplink control channel based at least in part on the resource pattern or the set of resource patterns; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting configuration information for an uplink control channel, wherein the configuration information includes at least one of: a first resource identifier associated with a non-full-duplex (non-FD) zone, or a second resource identifier associated with a full-duplex (FD) zone; means for receiving uplink control information (UCI) on the uplink control channel in at least one of the non-FD zone or the FD zone in accordance with the configuration information; means for triggering retransmission of the first UCI based at least in part on the first UCI being received in the non-FD zone; means for receiving the first UCI and the second UCI; means for combining the first UCI and the second UCI to generate the UCI; means for demodulating the first UCI and not the second UCI based at least in part on the first UCI being received in the non-FD zone and the second UCI being received in the FD zone; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may provide information on the uplink (UL) using UL control information (UCI). UCI may include, for example, channel state information (CSI), a scheduling request (SR), a hybrid automatic repeat request (HARQ) acknowledgment (ACK) or negative ACK (HACK), and/or the like, which may be referred to as UCI types. The UCI may be transmitted on a physical uplink control channel (PUCCH). Different UCI types may be associated with different priority levels. For example, a HARQ ACK/NACK may have a highest priority level, followed by an SR, and followed by CSI. CSI may have a higher sub-priority level and a lower sub-priority level. There may be different formats of PUCCH, such as a short PUCCH (e.g., Format 0, Format 2, and/or the like), a long PUCCH (e.g., Format 1, Format 3, Format 4, and/or the like), and/or the like. A UE may not transmit more than one PUCCH with HARQ-ACK information in a slot. When the UE transmits two PUCCHs in a slot, at least one of the two PUCCHs uses PUCCH Format 0 or PUCCH Format 2.

PUCCH Format 0 may include 1 or 2 symbols, may use sequence based transmission, may not use UCI and demodulation reference signal (DMRS) multiplexing, and may use coherent detection. PUCCH Format 2 may include 1 or 2 symbols, and may use UCI and DMRS frequency-division multiplexing A long PUCCH may use UCI and DMRS time-division multiplexing. In some aspects, multiple DMRS symbols may be transmitted in a single PUCCH transmission (e.g., a single hop). For example, 2 DMRS symbols may be transmitted per hop of a PUCCH Format 3 or 4 if both hops are more than X symbols when frequency hopping is enabled (X=4). 4 DMRS symbols may be transmitted for a PUCCH Format 3 or 4 with more than 2X+1 symbols when frequency hopping is disabled (X=4).

A wireless communication device may utilize full-duplex (FD) communication to increase link capacity and more efficiently utilize frequency and time resources. FD communication is described in more detail with regard to FIG. 3. However, FD communication may cause more interference in an FD zone (e.g., a time and/or frequency region in which FD communication occurs) than in a non-FD zone (e.g., a time and/or frequency region in which FD communication does not occur). Accordingly, UCI performance in the FD region may be worse than UCI performance in the non-FD region. This may be particularly problematic when UCI is transmitted by a UE and thus has low transmit power relative to BS transmissions. Furthermore, different UCI types are associated with different priority levels, so the transmission of a high-priority UCI in an FD zone (where interference is high) and/or a low-priority UCI in a non-FD zone (where interference is lower than in the FD zone) may be an inefficient utilization of network resources.

Some techniques and apparatuses described herein provide resource allocation for the transmission of UCI in FD zones and/or non-FD zones. For example, some techniques and apparatuses described herein cause high-priority UCI to be allocated to a non-FD zone in which interference is lower, and low-priority UCI to be allocated to an FD zone in which interference is higher. Furthermore, some techniques and apparatuses described herein provide signaling and/or configuration to support this resource allocation technique. Thus, the priority levels of the UCI may be preserved while more efficiently allocating FD-zone and non-FD zone resources.

Figure 3:
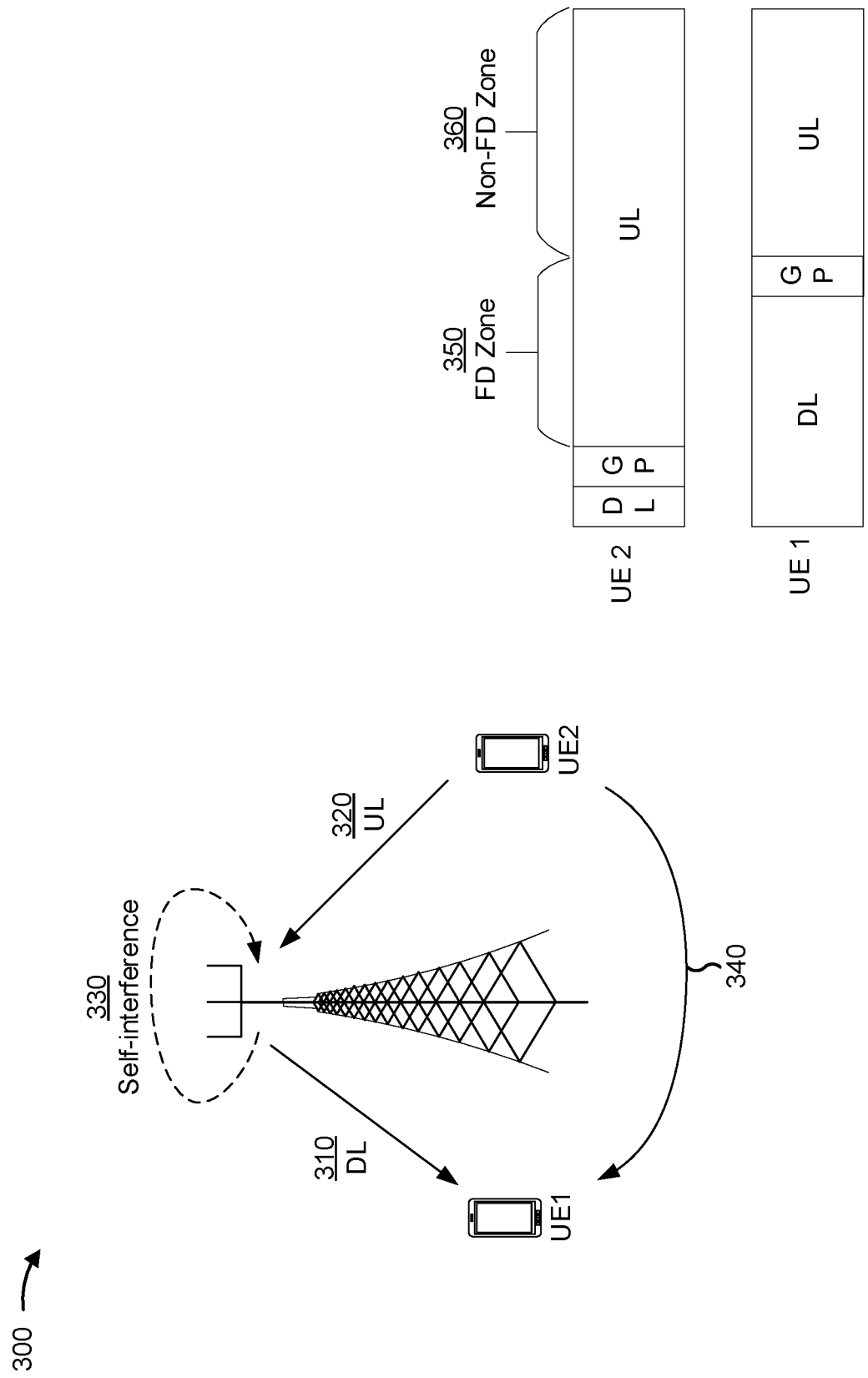
FIG. 3 is a diagram illustrating an example of an FD zone, a non-FD zone, and self-interference associated with FD communications, in accordance with various aspects of the present disclosure.

FIG. 3 is a diagram illustrating an example 300 of an FD zone, a non-FD zone, and self-interference associated with FD communications, in accordance with various aspects of the present disclosure. As shown, example 300 includes a BS (e.g., BS 110 and/or the like), a UE1 (e.g., UE 120 and/or the like), and a UE2 (e.g., UE 120 and/or the like). In some aspects, the BS may be capable of FD communication. FD communication may include a contemporaneous uplink and downlink communication using the same resources. For example, the BS may perform a downlink (DL) transmission to a UE1 (shown by reference number 310) and may receive an uplink (UL) transmission from a UE2 (shown by reference number 320) using the same frequency resources and at least partially overlapping in time.

As shown by reference number 330, the DL transmission from the BS may self-interfere with the UL transmission to the BS. This may be caused by a variety of factors, such as the higher transmit power of the DL transmission, radio frequency bleeding, and/or the like. Furthermore, as shown by reference number 340, the UL transmission to the BS from the UE2 may interfere with the DL transmission from the BS to the UE1, thereby diminishing DL performance of the UE1.

An FD zone is shown by reference number 350 and a non-FD zone is shown by reference number 360. As used herein, an FD zone refers to a time period and/or a frequency region in which a wireless communication device (e.g., a BS 110, a UE 120, a node, a wireless communication device, and/or the like) performs FD communication, and a non-FD zone refers to a time period and/or a frequency region in which a wireless communication device performs non-FD communication. The FD zone may be associated with higher self-interference, and therefore a lower signal-to-interference-plus-noise ratio (SINR), than the non-FD zone. Techniques and apparatuses described herein provide for the splitting of uplink control information (UCI) between an FD zone and a non-FD zone (or for allocation of the UCI to the non-FD zone) to improve the performance of the UCI and improve conformance with UCI quality of service requirements.

As indicated above, FIG. 3 is provided as an example. Other examples may differ from what is described with respect to FIG. 3.

Figure 4:
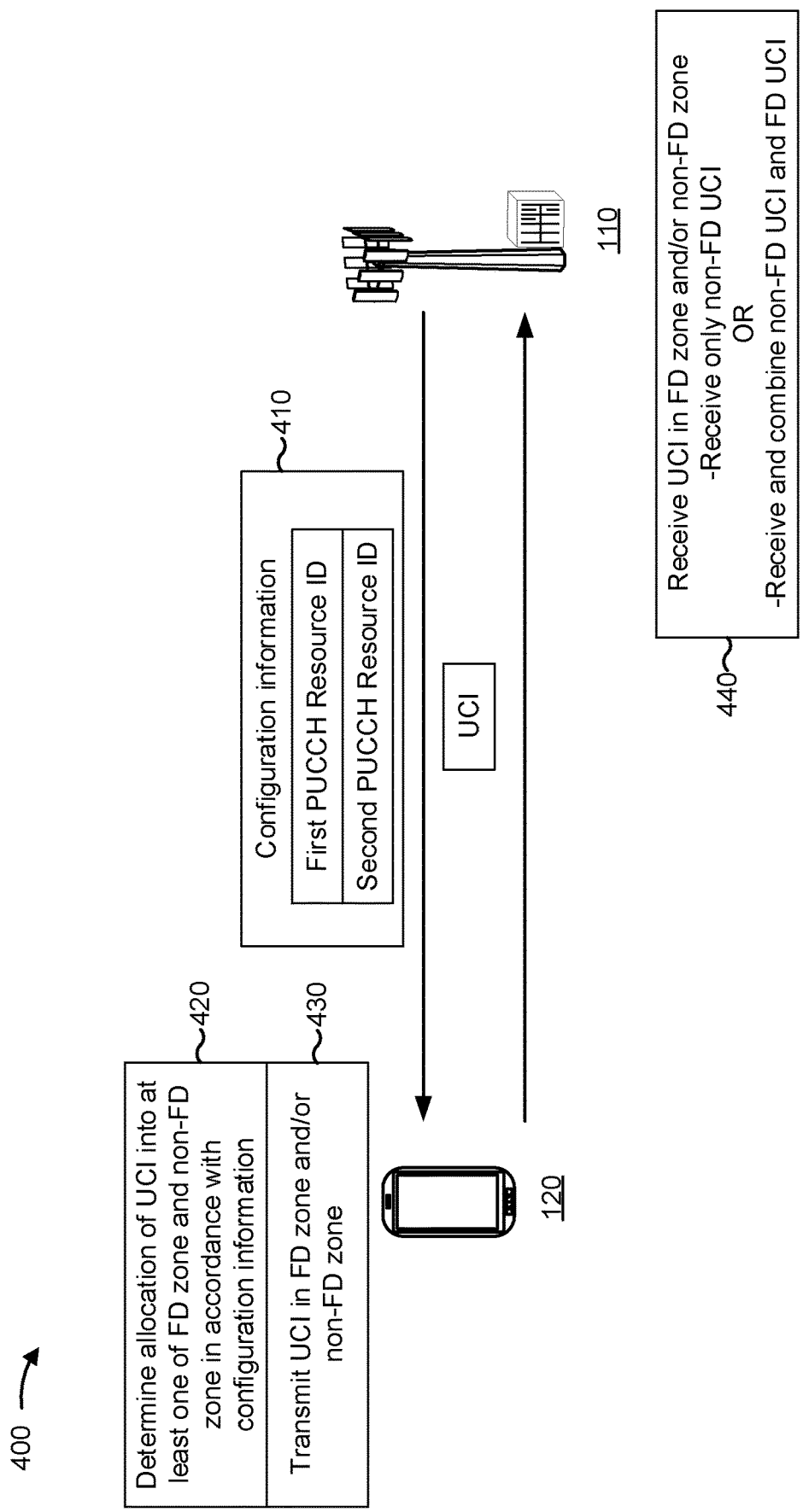
FIG. 4 is a diagram illustrating an example of splitting UCI for FD communications, in accordance with various aspects of the present disclosure.

FIG. 4 is a diagram illustrating an example 400 of splitting UCI for FD communications, in accordance with various aspects of the present disclosure. As shown, example 400 includes a BS 110 and a UE 120. The BS 110 may be capable of FD communication with the UE 120 and/or other UEs 120 covered by the BS 110.

As shown by reference number 410, the BS 110 may provide configuration information to the UE 120. The BS 110 may provide the configuration information using any messaging type, such as radio resource control (RRC) signaling, downlink control information, a media access control (MAC) control element (CE), high-layer configuration information, and/or the like. The configuration information may indicate how UCI, to be transmitted by the UE 120, is to be allocated to one or more of a non-FD zone or an FD zone, as described in more detail below.

As shown, the configuration information may include a first resource identifier, shown as a first PUCCH resource identifier. The first resource identifier may be associated with the non-FD zone. For example, the first resource identifier may indicate a resource allocation of the non-FD zone, a resource set of the non-FD zone, and/or the like. In some aspects, the BS 110 may provide only the first resource identifier. If the BS 110 provides only the first resource identifier (e.g., if only the first resource identifier and not the second resource identifier is configured), then the UE 120 may use only the non-FD zone for transmission of UCI. For example, the BS 110 may determine that the non-FD zone is sufficient for the UCI payload, and may accordingly configure only the non-FD zone for the uplink control channel transmission.

In some aspects, the first resource identifier may explicitly identify a single parameter (e.g., a resource index to indicate which resource is to be used for the non-FD transmission and/or the like). This may conserve signaling resources that would otherwise be used to signal configuration information for multiple resource locations. In some aspects, the first resource identifier may identify a parameter using an index, such as an index corresponding to a particular resource location of multiple configured resource locations. This may conserve signaling resources that would otherwise be used to signal an explicit indication of the resource location, which may be more resource-intensive than signaling an index.

As shown, the configuration information may include a second resource identifier, shown as a second PUCCH resource identifier. The second resource identifier may be associated with the FD zone. For example, the second resource identifier may indicate a resource allocation of the FD-zone, a resource set of the FD zone, and/or the like.

In some aspects, a frame structure of the UE 120 and/or an FD configuration of the UE 120 may be semi-persistent or periodic. In such a case, the distribution of FD zones and non-FD zones, or of UCI transmissions in the FD zones and the non-FD zones, may follow one or more patterns. In some aspects, the second resource identifier may be provided using RRC signaling. For example, the second resource identifier may include an RRC value that identifies a particular pattern. Based at least in part on the UCI payload to be transmitted by the UE 120, or an indication received from the BS 110 in downlink control information (DCI), the UE 120 may transmit the UCI in the FD zone and/or the non-FD zone. In some aspects, the second resource identifier may be provided as DCI. For example, the second resource identifier may identify a pattern from a plurality of configured patterns. In such a case, the second resource identifier may include an index corresponding to the pattern, an index corresponding to a set of patterns (e.g., from which the UE 120 may select a pattern for transmission of the UCI), an index corresponding to particular resource allocation patterns for the FD zone, and/or the like.

In some aspects, the frame structure of the UE 120 and/or the FD configuration of the UE 120 may be random, may be pseudorandom, or may not be configured in accordance with a pattern. In such a case, the second resource identifier may include a parameter (e.g., an index, such as a resource index and/or the like) that identifies a resource allocation, an index of a set of parameters to be used to determine the resource allocation, and/or the like.

In some aspects, the UE 120 may receive an indication of whether the UE 120 is to receive the second resource identifier. For example, the UE 120 may receive information indicating whether the second resource identifier is configured. This information may be provided using, for example, DCI, RRC signaling, and/or the like. This may reduce processing load at the UE 120 that would otherwise be used to dynamically detect the second resource identifier. In some aspects, the UE 120 may dynamically detect the second resource identifier. For example, the UE 120 may detect whether the BS 110 transmits the second resource identifier irrespective of whether an indicator is received (e.g., using blind decoding or a similar approach), which may reduce signaling resource consumption of the BS 110.

As shown by reference number 420, the UE 120 may determine an allocation of UCI into at least one of the FD zone or the non-FD zone in accordance with the configuration information. For example, the UE 120 may determine the allocation of CSI, an ACK/NACK, a scheduling request, and/or the like into one or more of the FD zone or the non-FD zone. In some aspects, the UE 120 may determine the allocation of the UCI based at least in part on an indication received from the BS 110. In some aspects, the UE 120 may determine allocation based at least in part on a priority rule. Each is described in turn below. When a first part of the UCI is allocated to the non-FD zone and a second part of the UCI is allocated to the FD zone, the UCI may be said to be split between the non-FD zone and the FD zone.

In some aspects, a rule or table may indicate which UCI is to be transmitted in the FD zone. For example, the rule or table may include a predefined rule, a predefined table, and/or the like. In some aspects, the rule or table may be configured using RRC signaling. For example, the BS 110 may configure which UCI should be transmitted in the FD zone (e.g., the rule may indicate that only CSI is to be transmitted in the FD zone).

In some aspects, the BS 110 may indicate which UCI is to be transmitted in the FD zone. For example, the BS 110 may provide DCI, RRC signaling, and/or the like that indicates which CSI is to be transmitted in the FD zone. In some aspects, such an indication may correspond to a particular slot, a particular UE 120, a particular location, and/or the like. In some aspects, the indication of which UCI is to be transmitted in the FD zone may be configurable, dynamic or flexible (e.g., may be configured using RRC, may be dynamically indicated using DCI, or may be indicated from a plurality of possible values). As an example of dynamic indication, when FD and non-FD zones are configured, and when ACK/NACK, SR, and CSI are multiplexed for the PUCCH, the BS 110 may indicate that CSI is to be transmitted in the FD zone, and the ACK/NACK and the SR are to be transmitted in the non-FD zone. As another example, the BS 110 may indicate that CSI and SR are to be transmitted in the FD zone, and the ACK/NACK is to be transmitted in the non-FD zone.

In some aspects, the UCI in the FD zone may be a repetition of the UCI in the non-FD zone. This may improve reception of the UCI by the BS 110, as described below. In some aspects, different portions of the UCI may use different PUCCH formats, based at least in part on the UCI type of the UCI and a configured PUCCH symbol length. For example, for a non-FD zone with a 2-symbol UCI length, the UE 120 may use a short PUCCH format (e.g., Format 0) to perform an ACK/NACK transmission.

In some aspects, when the second resource identifier is not configured, the BS 110 may configure the non-FD zone for a transmission by performing rate-matching, which may conserve signaling resources that would otherwise be used to configure transmission of the CSI in the FD zone and the non-FD zone.

As shown by reference number 430, the UE 120 may transmit the UCI in the FD zone and/or the non-FD zone. For example, when only the first resource identifier is received, the UE 120 may transmit the UCI in only the non-FD zone. When the first resource identifier and the second resource identifier are received, the UE 120 may transmit a first part of the UCI (e.g., a higher-priority part) in the non-FD zone, and may transmit a second part of the UCI (e.g., a lower-priority part) in the FD zone. Thus, reliability of UCI is improved.

In some aspects, the CSI in the FD zone and the CSI in the non-FD zone may be associated with different power control parameters. For example, a transmission in the FD zone may use a modified transmit power relative to a transmission in the non-FD zone. In some aspects, the FD zone and the non-FD zone may use independent power control parameters (e.g., independent from each other). In some aspects, the FD zone may use a fixed power boosting ratio relative to the non-FD zone. For example, a power for the FD zone, denoted as P_FD, may be defined relative to a power for the non-FD zone, denoted as P_NFD, using a power boosting ratio of beta:

$$P\_FD = beta * P\_NFD.$$

In some aspects, the FD zone and the non-FD zone may use different power boosting parameters than a baseline physical uplink shared channel (PUSCH) power level. For example, where P denotes the PUSCH power level:

$$P\_FD = beta\_1 * P, P\_NFD = beta\_2 * P.$$

As shown by reference number 440, the BS 110 may receive the UCI in the FD zone and/or the non-FD zone. In some aspects, the BS 110 may demodulate or receive only the UCI in the non-FD zone. In such a case, the BS 110 may discard the FD-zone portions of the UCI (since the FD-zone portions of the UCI may be associated with a low reliability). In some aspects, the BS 110 may trigger repetition or retransmission of only the FD zone portion of the UCI in a next UL transmission. In some aspects, the BS 110 may trigger repetition or retransmission of the non-FD zone portion of the UCI in a next UL transmission. Thus, the BS 110 may conserve resources that would otherwise be used to attempt to decode an FD-zone UCI transmission with a low likelihood of success.

In some aspects, the BS 110 may receive the UCI in the non-FD zone and the UCI in the FD zone. In such a case, the BS 110 may combine the UCI from the non-FD zone and the UCI from the FD zone to generate the UCI. For example, some UCI (e.g., a CSI and/or the like) may be split between the FD zone and the non-FD zone, or some UCI may be repeated in the FD zone and the non-FD zone. In such cases, the BS 110 may combine the UCI from each zone to form a combined UCI.

As indicated above, FIG. 4 is provided as an example. Other examples may differ from what is described with respect to FIG. 4.

Figure 5:
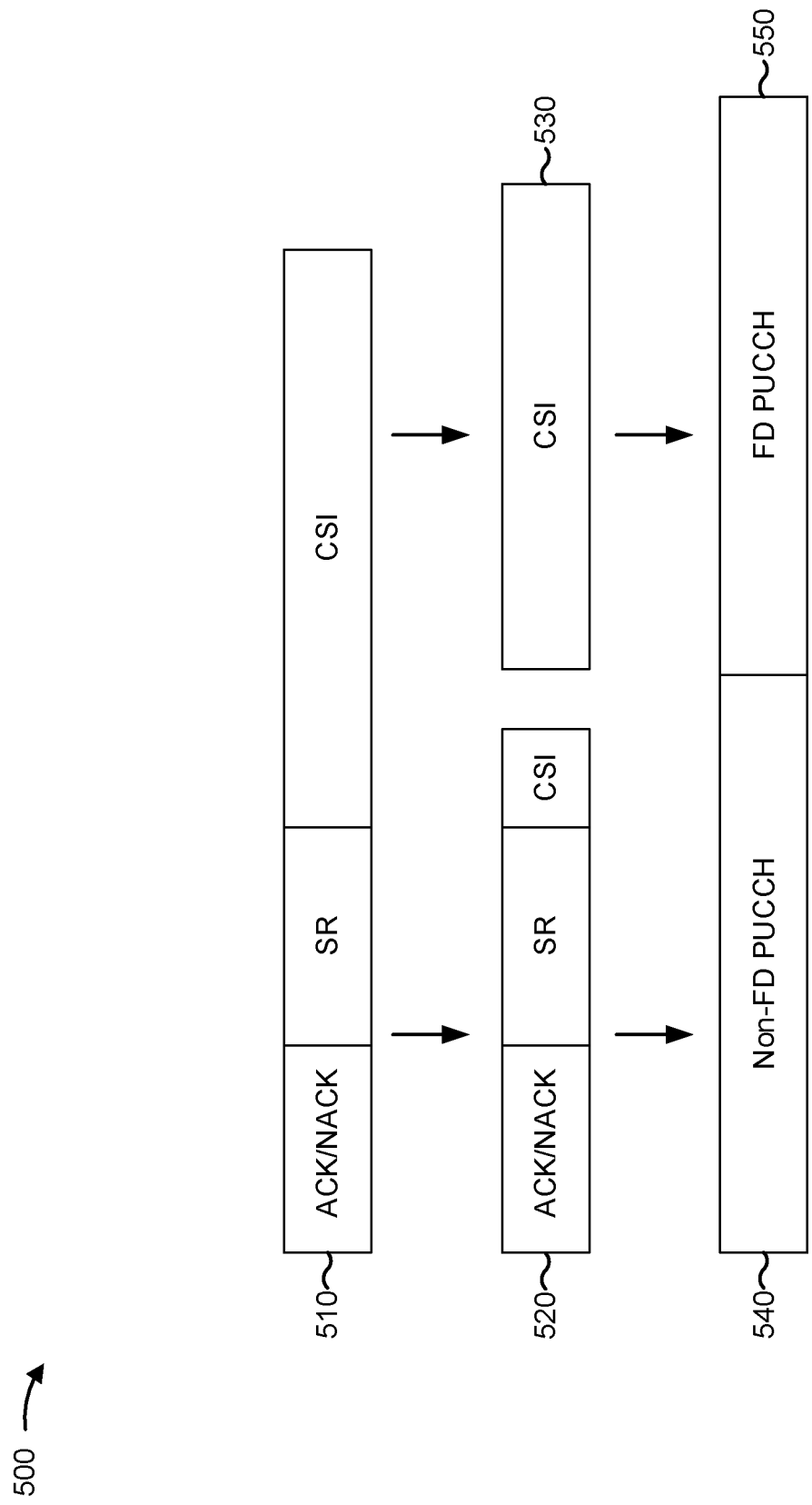
FIG. 5 is a diagram illustrating an example of a priority-based approach for splitting UCI for FD communications, in accordance with various aspects of the present disclosure.

FIG. 5 is a diagram illustrating an example 500 of a priority-based approach for splitting UCI for FD communications, in accordance with various aspects of the present disclosure. Reference number 510 shows UCI to be transmitted by a UE (e.g., UE 120 and/or the like). Here, the UCI includes an ACK/NACK, an SR, and a CSI. A highest-priority UCI is at the leftmost side of example 500, and the priority level deceases toward the right. For example, the ACK/NACK is associated with a highest priority level and the CSI is associated with a lowest priority level.

In some aspects, the UE may allocate the UCI into a non-FD zone part (shown by reference number 520) and an FD zone part (shown by reference number 530) based at least in part on respective priority levels of parts of the UCI. For example, the UE may identify a UCI bit sequence in accordance with respective priority levels of the parts of the UCI (e.g., ACK/NACK first, SR second, and CSI third). In other words, the UCI bit sequence may have a highest-priority UCI part first, a second-highest-priority UCI part second, and so on. The UE 120 may divide the UCI bit sequence into the two parts based at least in part on the resource size of the FD zone and the non-FD zone, where a first part is for the non-FD zone and the second part is for the FD zone. As shown, some UCI may be split between the FD zone and the non-FD zone (here, the CSI). In this way, the BS may configure the resource allocation for the FD zone and the non-FD zone, and the UE may allocate the CSI to the FD zone and the non-FD zone in accordance with the resource allocation. It should be understood that resource allocation and resource location are used interchangeably herein.

The first part, associated with the higher-priority UCI, may be transmitted in the non-FD zone (shown by reference number 540), thereby improving reliability and reducing SINR of the higher-priority UCI. The second part, associated with the lower-priority UCI, may be transmitted in the FD zone (shown by reference number 550), thus providing lower-priority UCI on a less reliable resource allocation.

As indicated above, FIG. 5 is provided as an example. Other examples may differ from what is described with respect to FIG. 5.

Figure 6:
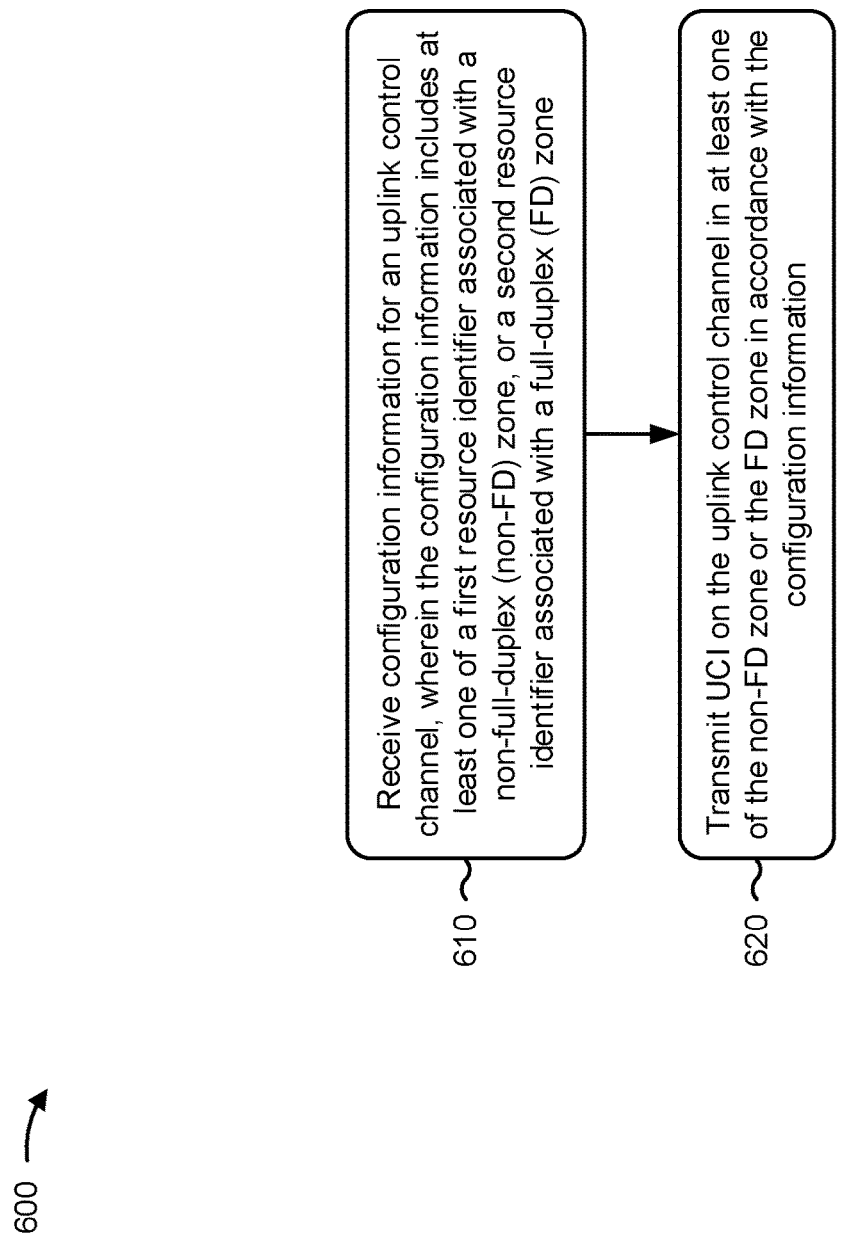
FIG. 6 is a diagram illustrating an example process performed, for example, by a user equipment, in accordance with various aspects of the present disclosure.

FIG. 6 is a diagram illustrating an example process 600 performed, for example, by a user equipment, in accordance with various aspects of the present disclosure. Example process 600 is an example where a UE (e.g., UE 120 and/or the like) performs operations associated with split UCI for FD communications.

As shown in FIG. 6, in some aspects, process 600 may include receiving configuration information for an uplink control channel, wherein the configuration information includes at least one of a first resource identifier associated with a non-full-duplex (non-FD) zone, or a second resource identifier associated with a full-duplex (FD) zone (block 610). For example, the UE (e.g., using antenna 252, DEMOD 254, MIMO detector 256, receive processor 258, controller/processor 280, and/or the like) may receive configuration information for an uplink control channel. The configuration information may include at least one of a first resource identifier associated with a non-FD zone, or a second resource identifier associated with an FD zone, as described above.

As further shown in FIG. 6, in some aspects, process 600 may include transmitting UCI on the uplink control channel in at least one of the non-FD zone or the FD zone in accordance with the configuration information (block 620). For example, the UE (e.g., using controller/processor 280, transmit processor 264, TX MIMO processor 266, MOD 254, antenna 252, and/or the like) may transmit UCI on the uplink control channel in at least one of the non-FD zone or the FD zone in accordance with the configuration information, as described above.

Process 600 may include additional aspects, such as any single aspect or any combination of aspects described below and/or in connection with one or more other processes described elsewhere herein.

In a first aspect, the first resource identifier and the second resource identifier include physical uplink control channel resource identifiers.

In a second aspect, alone or in combination with the first aspect, receiving the configuration information for the uplink control channel further comprises receiving only the first resource identifier.

In a third aspect, alone or in combination with one or more of the first and second aspects, the UE may receive an indicator of whether the second resource identifier is configured.

In a fourth aspect, alone or in combination with one or more of the first through third aspects, receiving the configuration information for the uplink control channel further comprises dynamically detecting the second resource identifier.

In a fifth aspect, alone or in combination with one or more of the first through fourth aspects, when the configuration information includes the first resource identifier and the second resource identifier, the UCI is split between the non-FD zone and the FD zone.

In a sixth aspect, alone or in combination with one or more of the first through fifth aspects, when the configuration information includes only the first resource identifier, the UCI is transmitted in only the non-FD zone.

In a seventh aspect, alone or in combination with one or more of the first through sixth aspects, the first resource identifier includes a resource index that identifies a resource in the non-FD zone for the uplink control channel.

In an eighth aspect, alone or in combination with one or more of the first through seventh aspects, the first resource identifier includes a set of parameters that identify a resource in the non-FD zone for the uplink control channel.

In a ninth aspect, alone or in combination with one or more of the first through eighth aspects, resources in the non-FD zone and the FD zone are periodic or semi-persistent.

In a tenth aspect, alone or in combination with one or more of the first through ninth aspects, the second resource identifier is provided using radio resource control signaling.

In an eleventh aspect, alone or in combination with one or more of the first through tenth aspects, a resource pattern for the second resource identifier is indicated using downlink control information.

In a twelfth aspect, alone or in combination with one or more of the first through eleventh aspects, the second resource identifier indicates a resource pattern in the FD zone, wherein the uplink control information is transmitted on a resource selected from the resource pattern in the FD zone.

In a thirteenth aspect, alone or in combination with one or more of the first through twelfth aspects, the second resource identifier indicates a resource pattern or a set of resource patterns, and the UE may select a resource for the uplink control channel based at least in part on the resource pattern or the set of resource patterns.

In a fourteenth aspect, alone or in combination with one or more of the first through thirteenth aspects, the second resource identifier includes a resource index that identifies a resource in the FD zone for the uplink control channel.

In a fifteenth aspect, alone or in combination with one or more of the first through fourteenth aspects, the second resource identifier includes a set of parameters that identify a resource in the FD zone for the uplink control channel.

In a sixteenth aspect, alone or in combination with one or more of the first through fifteenth aspects, the UCI comprises first UCI and second UCI, wherein the first UCI is transmitted in the non-FD zone, and the second UCI is transmitted in the FD zone.

In a seventeenth aspect, alone or in combination with one or more of the first through sixteenth aspects, the first UCI is transmitted in the non-FD zone and the second UCI is transmitted in the FD zone based at least in part on a rule indicating which UCI is to be transmitted in the non-FD zone or in the FD zone.

In an eighteenth aspect, alone or in combination with one or more of the first through seventeenth aspects, the first UCI is transmitted in the non-FD zone and the second UCI is transmitted in the FD zone based at least in part on the configuration information indicating that the first UCI is to be transmitted in the non-FD zone and the second UCI is to be transmitted in the FD zone.

In a nineteenth aspect, alone or in combination with one or more of the first through eighteenth aspects, the first UCI is transmitted in the non-FD zone and the second UCI is transmitted in the FD zone based at least in part on respective UCI types of the first UCI and the second UCI.

In a twentieth aspect, alone or in combination with one or more of the first through nineteenth aspects, the first UCI is associated with a first priority level and the second UCI is associated with a second priority level. In some aspects, the first UCI and the second UCI are transmitted in the non-FD zone and the FD zone, respectively, based at least in part on the first priority level and the second priority level.

In a twenty first aspect, alone or in combination with one or more of the first through twentieth aspects, a higher-priority UCI, of the first UCI and the second UCI, is transmitted in the non-FD zone.

In a twenty second aspect, alone or in combination with one or more of the first through twenty first aspects, the UCI is transmitted in the non-FD zone and a repetition of the UCI is transmitted in the FD zone.

In a twenty third aspect, alone or in combination with one or more of the first through twenty second aspects, the uplink control channel includes a first uplink control channel transmitted in the non-FD zone and a second uplink control channel transmitted in the FD zone.

In a twenty fourth aspect, alone or in combination with one or more of the first through twenty third aspects, the first uplink control channel uses a first format and the second uplink control channel uses a second format.

In a twenty fifth aspect, alone or in combination with one or more of the first through twenty fourth aspects, the first format and the second format are selected based at least in part on respective UCI types associated with the first uplink control channel and the second uplink control channel, or based at least in part on a symbol length of the first uplink control channel or the second uplink control channel.

In a twenty sixth aspect, alone or in combination with one or more of the first through twenty fifth aspects, the first uplink control channel and the second uplink control channel are associated with respective power control parameters that are independent from each other.

In a twenty seventh aspect, alone or in combination with one or more of the first through twenty sixth aspects, a power control parameter of the first uplink control channel is modified relative to a power control parameter of the second uplink control channel based at least in part on a power boosting ratio.

In a twenty eighth aspect, alone or in combination with one or more of the first through twenty seventh aspects, the first uplink control channel and the second uplink control channel are associated with respective power boosting ratios relative to an uplink shared channel transmit power.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
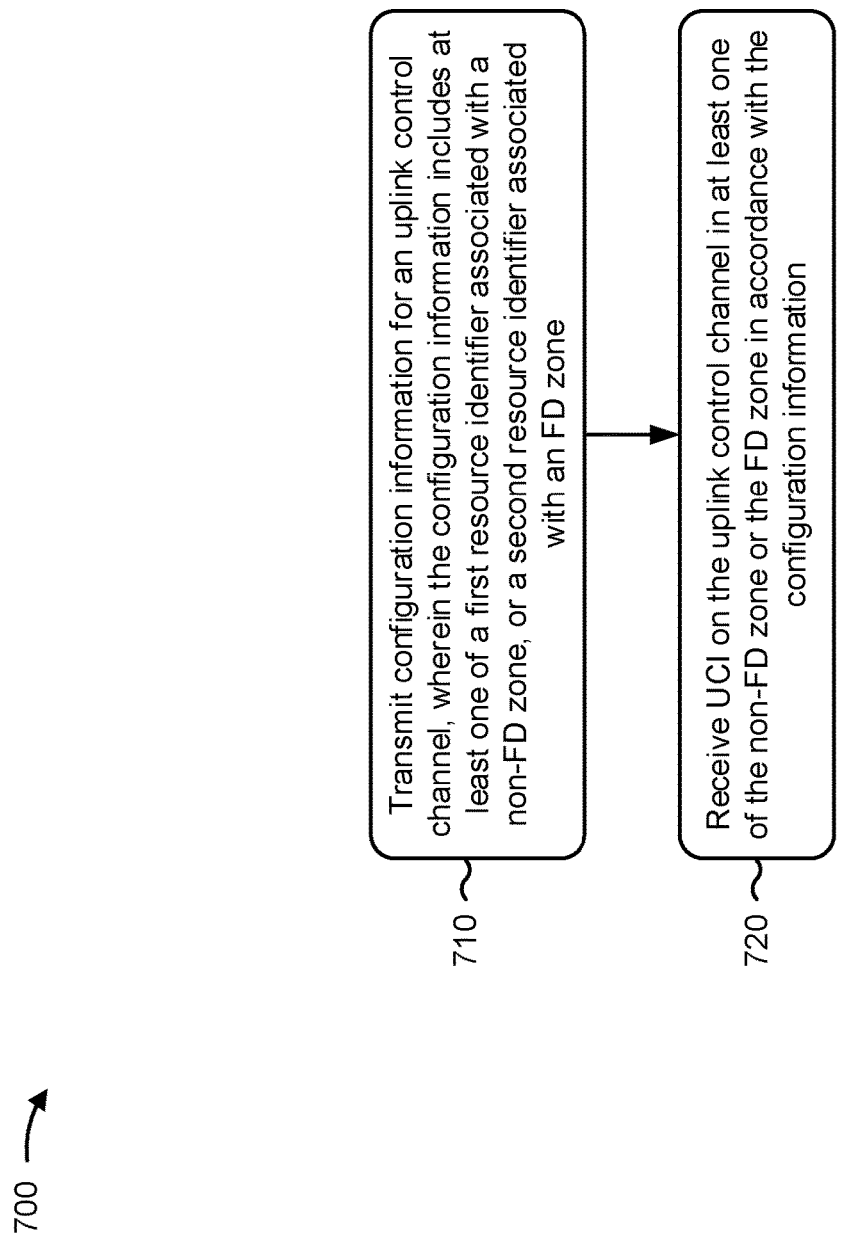
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where a base station (e.g., base station 110 and/or the like) performs operations associated with split UCI for FD communications.

As shown in FIG. 7, in some aspects, process 700 may include transmitting configuration information for an uplink control channel, wherein the configuration information includes at least one of a first resource identifier associated with a non-FD zone, or a second resource identifier associated with an FD zone (block 710). For example, the base station (e.g., using controller/processor 240, transmit processor 220, TX MIMO processor 230, MOD 232, antenna 234, and/or the like) may transmit configuration information for an uplink control channel. In some aspects, the configuration information includes at least one of: a first resource identifier associated with a non-FD zone, or a second resource identifier associated with an FD zone.

As further shown in FIG. 7, in some aspects, process 700 may include receiving UCI on the uplink control channel in at least one of the non-FD zone or the FD zone in accordance with the configuration information (block 720). For example, the base station (e.g., using antenna 234, DEMOD 232, MIMO detector 236, receive processor 238, controller/processor 240, and/or the like) may receive UCI on the uplink control channel in at least one of the non-FD zone or the FD zone in accordance with the configuration information, as described above.

Process 700 may include additional aspects, such as any single aspect or any combination of aspects described below and/or in connection with one or more other processes described elsewhere herein.

In a first aspect, the first resource identifier and the second resource identifier include physical uplink control channel resource identifiers.

In a second aspect, alone or in combination with the first aspect, when the configuration information includes the first resource identifier and the second resource identifier, the UCI is split between the non-FD zone and the FD zone.

In a third aspect, alone or in combination with one or more of the first and second aspects, when the configuration information includes only the first resource identifier, the UCI is transmitted in only the non-FD zone.

In a fourth aspect, alone or in combination with one or more of the first through third aspects, the first resource identifier includes a resource index that identifies a resource in the non-FD zone for the uplink control channel.

In a fifth aspect, alone or in combination with one or more of the first through fourth aspects, the first resource identifier includes a set of parameters that identify a resource in the non-FD zone for the uplink control channel.

In a sixth aspect, alone or in combination with one or more of the first through fifth aspects, resources in the non-FD zone and the FD zone are periodic or semi-persistent.

In a seventh aspect, alone or in combination with one or more of the first through sixth aspects, the second resource identifier is provided using radio resource control signaling.

In an eighth aspect, alone or in combination with one or more of the first through seventh aspects, a resource pattern for the second resource identifier is indicated using downlink control information.

In a ninth aspect, alone or in combination with one or more of the first through eighth aspects, the second resource identifier indicates a resource pattern in the FD zone. In some aspects, the uplink control information is transmitted on a resource selected from the resource pattern in the FD zone.

In a tenth aspect, alone or in combination with one or more of the first through ninth aspects, the second resource identifier indicates a resource pattern or a set of resource patterns.

In an eleventh aspect, alone or in combination with one or more of the first through tenth aspects, the second resource identifier includes a resource index that identifies a resource in the FD zone for the uplink control channel.

In a twelfth aspect, alone or in combination with one or more of the first through eleventh aspects, the second resource identifier includes a set of parameters that identify a resource in the FD zone for the uplink control channel.

In a thirteenth aspect, alone or in combination with one or more of the first through twelfth aspects, the UCI comprises first UCI and second UCI, wherein the first UCI is received in the non-FD zone, and the second UCI is received in the FD zone.

In a fourteenth aspect, alone or in combination with one or more of the first through thirteenth aspects, the first UCI is received in the non-FD zone and the second UCI is received in the FD zone based at least in part on a rule indicating which UCI is to be transmitted in the non-FD zone or in the FD zone.

In a fifteenth aspect, alone or in combination with one or more of the first through fourteenth aspects, the first UCI is received in the non-FD zone and the second UCI is received in the FD zone based at least in part on the configuration information indicating that the first UCI is to be transmitted in the non-FD zone and the second UCI is to be transmitted in the FD zone.

In a sixteenth aspect, alone or in combination with one or more of the first through fifteenth aspects, the first UCI is received in the non-FD zone and the second UCI is received in the FD zone based at least in part on respective UCI types of the first UCI and the second UCI.

In a seventeenth aspect, alone or in combination with one or more of the first through sixteenth aspects, the first UCI is associated with a first priority level and the second UCI is associated with a second priority level, wherein the first UCI and the second UCI are received in the non-FD zone and the FD zone, respectively, based at least in part on the first priority level and the second priority level.

In an eighteenth aspect, alone or in combination with one or more of the first through seventeenth aspects, a higher-priority UCI, of the first UCI and the second UCI, is received in the non-FD zone.

In a nineteenth aspect, alone or in combination with one or more of the first through eighteenth aspects, the base station may demodulate the first UCI and not the second UCI based at least in part on the first UCI being received in the non-FD zone and the second UCI being received in the FD zone.

In a twentieth aspect, alone or in combination with one or more of the first through nineteenth aspects, the base station may trigger retransmission of the first UCI based at least in part on the first UCI being received in the non-FD zone.

In a twenty first aspect, alone or in combination with one or more of the first through twentieth aspects, the base station may receive the first UCI and the second UCI; and combine the first UCI and the second UCI to generate the UCI.

In a twenty second aspect, alone or in combination with one or more of the first through twenty first aspects, the UCI is transmitted in the non-FD zone and a repetition of the UCI is transmitted in the FD zone.

In a twenty third aspect, alone or in combination with one or more of the first through twenty second aspects, the uplink control channel includes a first uplink control channel transmitted in the non-FD zone and a second uplink control channel transmitted in the FD zone.

In a twenty fourth aspect, alone or in combination with one or more of the first through twenty third aspects, the first uplink control channel uses a first format and the second uplink control channel uses a second format.

In a twenty fifth aspect, alone or in combination with one or more of the first through twenty fourth aspects, the first format and the second format are selected based at least in part on respective UCI types associated with the first uplink control channel and the second uplink control channel, or based at least in part on a symbol length of the first uplink control channel or the second uplink control channel.

In a twenty sixth aspect, alone or in combination with one or more of the first through twenty fifth aspects, the first uplink control channel and the second uplink control channel are associated with respective power control parameters that are independent from each other.

In a twenty seventh aspect, alone or in combination with one or more of the first through twenty sixth aspects, a power control parameter of the first uplink control channel is modified relative to a power control parameter of the second uplink control channel based at least in part on a power boosting ratio.

In a twenty eighth aspect, alone or in combination with one or more of the first through twenty seventh aspects, the first uplink control channel and the second uplink control channel are associated with respective power boosting ratios relative to an uplink shared channel transmit power.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving configuration information for an uplink control channel, wherein the configuration information includes at least one of:
   a first resource identifier associated with a non-full-duplex (non-FD) zone, or
   a second resource identifier associated with a full-duplex (FD) zone; and
   transmitting uplink control information (UCI) on the uplink control channel in at least one of the non-FD zone or the FD zone in accordance with the configuration information, wherein, when the configuration information includes the first resource identifier and the second resource identifier, the UCI is split between the non-FD zone and the FD zone.

2. The method of claim 1, wherein the first resource identifier and the second resource identifier include physical uplink control channel resource identifiers.

3. The method of claim 1, wherein receiving the configuration information for the uplink control channel further comprises receiving only the first resource identifier.

4. The method of claim 1, further comprising receiving an indicator of whether the second resource identifier is configured.

5. The method of claim 1, wherein receiving the configuration information for the uplink control channel further comprises dynamically detecting the second resource identifier.

6. The method of claim 1, wherein, when the configuration information includes only the first resource identifier, the UCI is transmitted in only the non-FD zone.

7. The method of claim 1, wherein the first resource identifier includes a resource index that identifies a resource in the non-FD zone for the uplink control channel.

8. The method of claim 1, wherein the first resource identifier includes a set of parameters that identify a resource in the non-FD zone for the uplink control channel.

9. The method of claim 1, wherein resources in the non-FD zone and the FD zone are periodic or semi-persistent.

10. The method of claim 1, wherein the second resource identifier is provided using radio resource control signaling.

11. The method of claim 1, wherein a resource pattern for the second resource identifier is indicated using downlink control information.

12. The method of claim 1, wherein the second resource identifier indicates a resource pattern in the FD zone, and wherein the uplink control information is transmitted on a resource selected from the resource pattern in the FD zone.

13. The method of claim 1, wherein the second resource identifier indicates a resource pattern or a set of resource patterns, and wherein the method further comprises:
selecting a resource for the uplink control channel based at least in part on the resource pattern or the set of resource patterns.

14. The method of claim 1, wherein the second resource identifier includes a resource index that identifies a resource in the FD zone for the uplink control channel.

15. The method of claim 1, wherein the second resource identifier includes a set of parameters that identify a resource in the FD zone for the uplink control channel.

16. The method of claim 1, wherein the UCI comprises first UCI and second UCI, wherein the first UCI is transmitted in the non-FD zone, and wherein the second UCI is transmitted in the FD zone.

17. The method of claim 16, wherein the first UCI is transmitted in the non-FD zone and the second UCI is transmitted in the FD zone based at least in part on a rule indicating which UCI is to be transmitted in the non-FD zone or in the FD zone.

18. The method of claim 16, wherein the first UCI is transmitted in the non-FD zone and the second UCI is transmitted in the FD zone based at least in part on the configuration information indicating that the first UCI is to be transmitted in the non-FD zone and the second UCI is to be transmitted in the FD zone.

19. The method of claim 16, wherein the first UCI is transmitted in the non-FD zone and the second UCI is transmitted in the FD zone based at least in part on respective UCI types of the first UCI and the second UCI.

20. The method of claim 16, wherein the first UCI is associated with a first priority level and the second UCI is associated with a second priority level, and wherein the first UCI and the second UCI are transmitted in the non-FD zone and the FD zone, respectively, based at least in part on the first priority level and the second priority level.

21. The method of claim 20, wherein a higher-priority UCI, of the first UCI and the second UCI, is transmitted in the non-FD zone.

22. The method of claim 1, wherein the UCI is transmitted in the non-FD zone and a repetition of the UCI is transmitted in the FD zone.

23. The method of claim 1, wherein the uplink control channel includes a first uplink control channel transmitted in the non-FD zone and a second uplink control channel transmitted in the FD zone.

24. The method of claim 23, wherein the first uplink control channel uses a first format and the second uplink control channel uses a second format.

25. The method of claim 24, wherein the first format and the second format are selected based at least in part on respective UCI types associated with the first uplink control channel and the second uplink control channel, or based at least in part on a symbol length of the first uplink control channel or the second uplink control channel.

26. The method of claim 23, wherein the first uplink control channel and the second uplink control channel are associated with respective power control parameters that are independent from each other.

27. The method of claim 23, wherein a power control parameter of the first uplink control channel is modified relative to a power control parameter of the second uplink control channel based at least in part on a power boosting ratio.

28. The method of claim 23, wherein the first uplink control channel and the second uplink control channel are associated with respective power boosting ratios relative to an uplink shared channel transmit power.

29. A method of wireless communication performed by a base station, comprising:
transmitting configuration information for an uplink control channel, wherein the configuration information includes at least one of:
a first resource identifier associated with a non-full-duplex (non-FD) zone, or
a second resource identifier associated with a full-duplex (FD) zone; and
receiving uplink control information (UCI) on the uplink control channel in at least one of the non-FD zone or the FD zone in accordance with the configuration information, wherein, when the configuration information includes the first resource identifier and the second resource identifier, the UCI is split between the non-FD zone and the FD zone.

30. The method of claim 29, wherein the first resource identifier and the second resource identifier include physical uplink control channel resource identifiers.

31. The method of claim 29, wherein, when the configuration information includes only the first resource identifier, the UCI is transmitted in only the non-FD zone.

32. A user equipment (UE) for wireless communication, comprising:
a memory; and
one or more processors operatively coupled to the memory, the memory and the one or more processors configured to:
receive configuration information for an uplink control channel, wherein the configuration information includes at least one of:
a first resource identifier associated with a non-full-duplex (non-FD) zone, or
a second resource identifier associated with a full-duplex (FD) zone; and
transmit uplink control information (UCI) on the uplink control channel in at least one of the non-FD zone or the FD zone in accordance with the configuration information, wherein, when the configuration information includes the first resource identifier and the second resource identifier, the UCI is split between the non-FD zone and the FD zone.

33. A base station for wireless communication, comprising:
a memory; and one or more processors operatively coupled to the memory, the memory and the one or more processors configured to:
transmit configuration information for an uplink control channel, wherein the configuration information includes at least one of:
a first resource identifier associated with a non-full-duplex (non-FD) zone, or
a second resource identifier associated with a full-duplex (FD) zone; and
receive uplink control information (UCI) on the uplink control channel in at least one of the non-FD zone or the FD zone in accordance with the configuration information, wherein, when the configuration information includes the first resource identifier and the second resource identifier, the UCI is split between the non-FD zone and the FD zone.

* * * * *